United States Patent [19]

Knowles

[11] 3,978,425
[45] Aug. 31, 1976

[54] LASER COMPONENTS AND FABRICATION METHODS

[75] Inventor: Carl Harry Knowles, Moorestown, N.J.

[73] Assignee: Metrologic Instruments, Inc., Bellmawr, N.J.

[22] Filed: Feb. 18, 1975

[21] Appl. No.: 550,747

Related U.S. Application Data

[62] Division of Ser. No. 490,204, July 19, 1974.

[52] U.S. Cl. .......................................... 331/94.5 C
[51] Int. Cl.² ............................................... H01S 3/08
[58] Field of Search .................................. 331/94.5

[56] References Cited
UNITED STATES PATENTS

| | | | |
|---|---|---|---|
| 3,555,450 | 1/1971 | Rockwell, Jr. | 331/94.5 |
| 3,717,823 | 2/1973 | Abdale et al. | 331/94.5 D |
| 3,826,998 | 7/1974 | Kindl et al. | 331/94.5 D |

*Primary Examiner*—William L. Sikes
*Attorney, Agent, or Firm*—Paul & Paul

[57] ABSTRACT

Glass compatible metal matrices are mounted in a glass forming boat and slugs of glass are applied to each. Heat is provided such that openings in the matrix are glassed, whereupon the entire sheet may be ground, polished, or otherwise processed as desired. Alternatively, open ended metallic portions may be utilized to control the amount of sag to which heated glass is subjected, thereby providing glass components of a desired radius of curvature. When metal framed optical components are secured in lasers by weldment, controlled crimping and deflection of the metallic laser jacket portion is utilized for precise alignment of the instrument.

5 Claims, 13 Drawing Figures

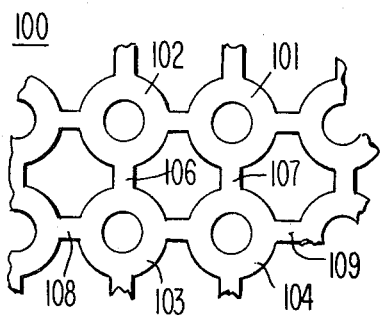
Fig. 1
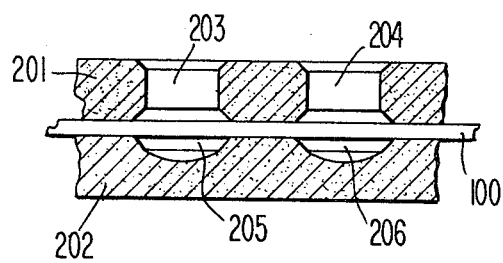
Fig. 2
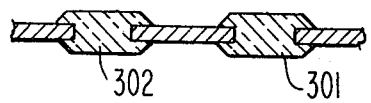
Fig. 3b
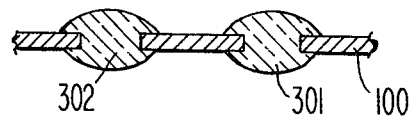
Fig. 3a
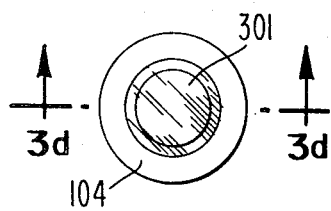
Fig. 3c
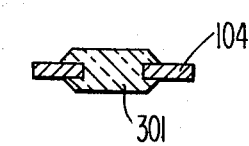
Fig. 3d
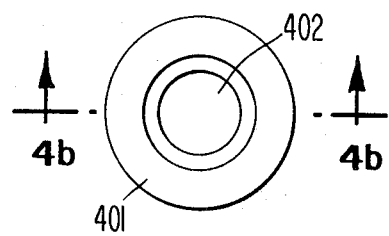
Fig. 4a
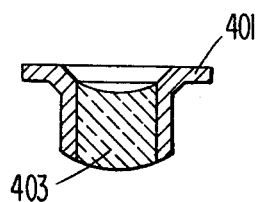
Fig. 4d
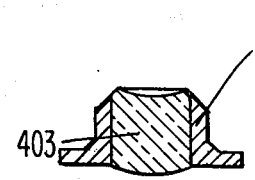
Fig. 4c
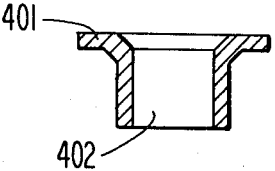
Fig. 4b
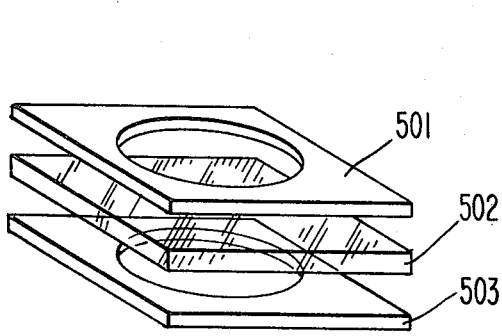
Fig. 5a
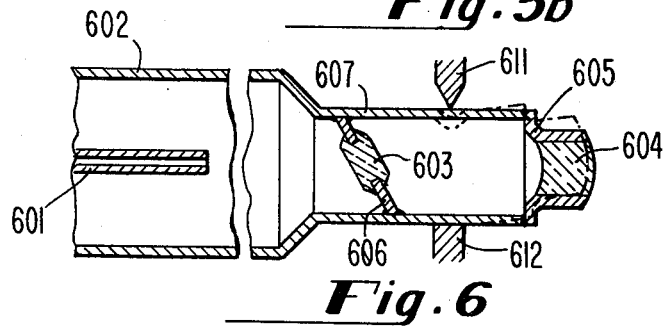
Fig. 5b
Fig. 6

LASER COMPONENTS AND FABRICATION METHODS

BACKGROUND OF THE INVENTION

This is a division of application Ser. No. 490,204, filed July 19, 1974 entitled LASER COMPONENTS AND FABRICATION METHODS.

This invention relates to apparatus and methods for the effective construction of laser tubes and associated apparatus. More particularly, it relates to the fabrication and installation of laser lens and mirror components.

As laser apparatus moves gradually from the status of scientific curiosity into the realm of large scale commercial applications, more stringent requirements are generally being imposed. As in any field, increasing demands are being placed on the durability and reliability of the lasers. Moreover, designers and ultimate users are increasingly demanding laser apparatus which performs in accordance with well defined and rigidly controlled specifications, and which furthermore maintains performance within the specifications over a long useful life span. Finally, more and more applications are being developed in which polarized coherent light is called for.

Within the foregoing framework of general demands being placed upon lasers, manufacturers perpetually are seeking laser designs, components, and fabrication methods which not only produce apparatus of the desired characteristics, but furthermore which may be produced economically, preferably on a large scale, mass-production basis.

The present invention is directed to achieving the foregoing specification and quality control goals, while operating on a profitable production basis. Furthermore, the principles of the present invention are also directed to solution of many of the more particular problems faced in the laser production business, some of which are as follows.

After the laser structure is generally assembled, but prior to evacuation and insemination with the lasing gases, it is desirable to purify the elements with a fast, hot, dry bake. Ideally, the parameters of this step are sufficient to drive out all parasitic substances which later might interact with, and cause the plasma to decompose with use. In accordance with the present state of the art, however, which typically seals lenses and mirrors to the tube either by means of a glass frit or epoxy resin, the use of the purifying bake step is necessarily limited. For example, epoxies typically possess a coefficient of thermal expansion as much as an order of magnitude larger than that of glass. Furthermore, the glass itself may be subjected to displacement or bending upon application of heat, thereby vitiating any adjustment in the laser tube.

It is therefore one specific object of the present invention to afford laser materials and components which are relatively impervious to conditions experienced in purification bakes of laser materials.

With regard to the optical components themselves, very specific and rigid requirements apply. First, it is necessary that lens and mirror components have a perfect or near perfect optical finish. This includes a smooth unblemished surface as well as an internal composition having a virtually zero density of striae. Moreover, when installed, the lenses and mirrors must be relatively strain free. It is clear that even in a perfect optical component, if unduly stressed when installed in the laser tube, birefringence will occur, thereby diminishing operational effectiveness. While the balance between overly tight installation, and risk of birefringence, is a severe one, it is correspondingly apparent that if the optical component is installed too loosely, the instrument may lase intermittently or not at all. It is preferable, furthermore, that expoxies be avoided as a sealant, since when subjected to heat either in the fabrication process or during operation, organic vapors are produced which interact with the plasma, causing it also to decompose. If these organic materials are still present after completion of fabrication, deposits will eventually form on the mirror and lens elements of the laser, with consequent degradation of power. Finally, it is desirable that optical components, once permanently installed, be amenable to various techniques for adjustment of the instrument to optimum lasing conditions.

It is accordingly a further object of the principles of the present invention to afford optical components and methods for installation of the same which achieve, as nearly as possible, the foregoing specific operational requirements.

Finally, it is to be noted that, notwithstanding the increasingly exacting specification burden placed upon manufacturers, overall production efficiency and economy always is mandated. It is accordingly a further object of the present invention that optical components be produced, installed, and adjusted to achieve the desired operating conditions in the most economical way available.

SUMMARY OF THE INVENTION

The present invention, as set forth both in its apparatus and method aspects, presents substantial advances toward achievement of the foregoing general and particular laser fabrication goals and constraints by utilizing metal in combination with glass to fabricate and to install the optical components. Lenses and mirrors are fabricated having the glass portion surrounded or encased by a compatible metal in an essentially strain free configuration. The metal itself may constitute a large grid work, thereby allowing for multiple lens processing. Once the glass is ground, as desired, the metal framed lens or mirror may be welded onto a metal encasing portion of a laser tube, in the position desired. Furthermore, the tightness of the metal bonds, without exerting undue stress on the lens, allows for heat purification, evacuation and glass insertion, and post fabrication alignment procedures whereby the metal casing may be displaced slightly, as desired, about the laser axis to achieve optimal lasing without disturbing the configuration or the balance of forces upon the lenses and mirrors.

In an illustrative embodiment for fabricating lenses, a Kovar grid work including interconnected annular portions is placed in a mold and optical glass pellets are introduced into each ring. Heat is applied and the glass melts and forms, in accordance with the shape of the mold, about each of the annular portions. The entire sheet may be polished to the desired optical characteristics, and each annulus is cut from the grid work and thereby is ready for installation by weldment into a metallic portion of a laser tube casing. Alternative embodiments feature glass compatible metallic cans for formation of lenses or mirrors, rather than the interconnected annular Kovar grid work.

By utilizing apparatus as set forth in the foregoing illustrative embodiments, and thereby facilitating use of metallic laser tube casings, final alignment procedures are made possible whereby the metallic casing may be selectively deformed in order to move mirrors and lenses affixed thereto into proper alignment with capillary and electrode portions of the laser for a fine tuning effect.

It is a primary feature of the present invention that high quality optical components for laser applications may be fabricated relatively cheaply on a mass production basis. Another feature of the principles of the present invention is that the metal framed components produced in accordance therewith may be secured into laser apparatus by weldments, thereby obviating many of the structural and functional problems of prior art lasers. More specifically, lasers fabricated in accordance with the principles of the present invention feature optically pure, relatively strain free and inexpensive components, and mounted in a fashion to permit simple yet high precision adjustment.

DESCRIPTION OF THE DRAWINGS

FIG. 1 shows a metallic array suggested for production of one type of lens which embodies the principles of the present invention;

FIG. 2 shows a side view of the matrix of FIG. 1 located in molding apparatus for producing lenses;

FIGS. 3a through 3d show; at various steps in the procedure, lenses produced in accordance with use of the FIG. 1 and FIG. 2 apparatus;

FIGS. 4a through 4d show an alternative configuration for a metal framed optical component;

FIGS. 5a and 5b show an alternative method for producing optical components; and FIG. 6 shows laser apparatus embodying the principles of the present invention.

DETAILED DESCRIPTION

As set forth hereinbefore, one of the chief difficulties in laser fabrication involves the use of epoxies or the like to secure the components to the laser structure. Although this problem is present relative to mounting of end mirrors, it is even more acute in the application of brewster windows inserted in the cavity along the laser optical path for purposes of polarization. Brewster windows must be optically polished to a very fine degree of flatness on both surfaces. Moreover, they must be strain free when mounted because, if strain is introduced, optical birefringence will occur within the brewster window, thereby producing considerable optical loss. In turn, such optical loss decreases the effectiveness of a brewster window by cutting down the total power of the laser. In the prior art, strain in brewster windows typically is introduced first in the formation and finishing of the windows, and secondly in the mounting thereof into the optical cavity. The principles of the present invention are directed to reducing internal strain in both steps of the process.

As set forth in FIGS. 1 through 3d, brewster angle windows of high optical quality and virtually zero internal strain may be produced cheaply and efficiently on a large scale basis. It is to be understood, moreover, that the procedures and techniques involved in fabrication of components such as set forth in FIGS. 1 through 3d may be utilized advantageously for other optical components than brewster angle windows, including mirrors.

FIG. 1 shows a top view of a metallic matrix suitable for use in accordance with the principles of the present invention. The matrix in FIG. 1 includes an array of annular portions such as 101 through 104 interconnected at points such as 106 through 109. The interior of the annular portions 101 through 104 is hollow, as are the interstices formed between the rings and the connecting portions. The matrix of FIG. 1, generally designated 100, is preferably embodied by a glass compatible metal such as the one known as Kovar, which is well known and readily available. Alternatively, any such metal which is compatible to bond with glass is acceptable. The configuration shown in FIG. 1 may be either photoformed or punched out of a relatively large sheet of metal, for example 30cm by 30cm. For preferred embodiments, the sheet is approximately 0.1mm thick, and the annular portions such as 101 through 104 are located approximately 1cm apart. In such preferred embodiments, approximately 1,000 windows could be fabricated from each sheet of Kovar material.

In order to produce a number of windows from the sheet 100 shown in FIG. 1, each of the openings in the annular portions 101 through 104 and the like is to be spanned with clear glass which is bonded to the Kovar. In FIG. 2, there is shown a mold arrangement whereby glass slugs may be inserted into each of the openings for formation of a window, and where each may be fired and molded, as desired. In FIG. 2, the matrix sheet 100 is sandwiched between top and bottom portions, 201 and 202 respectively, of a carbon boat fixture for firing and molding the windows. In particular, the boat 201 and 202 includes corresponding top and bottom openings, such as 203 with 205 and 204 with 206, which encapsulate the annular portions such as 101 through 104, allowing some overlap of the opening relative to the metallic portion of the annulus. When the top and bottom portions 201 and 202 of the boat are sandwiched over the sheet 100, glass slugs, which may be cut from a glass rod and cleaned by conventional techniques, may be placed individually in the openings such as 203 and 204, for example by shaking.

One type of glass which is quite acceptable for laser optics application and which is compatible with the Kovar metal constituting the sheet 100 is the type commercially known as "7052". Once the glass slugs are in place, the entire fixture is subjected to sufficient heat for the glass slugs to melt into place, thereby glassing the annular openings in the Kovar. When the glass has been cooled sufficiently to solidify to and bond around the sheet 100, the mold portions 201 and 202 may be withdrawn to yield a sheet generally of the configuration shown in cross section in FIG. 3a. As there set forth, glass has been formed in and around the openings in the sheet 100, and is ready for grinding and polishing, as desired.

As set forth in FIG. 3b, the entire sheet of FIG. 3a may be mounted on a conventional polishing fixture for forming the glass such as 301 and 302 into the desired shape for functioning as brewster windows. One of the advantages of the configuration shown is that the matrix may be mounted and held in a fixture in a manner which easily avoids contamination of the polishing compound by contact thereof with the metal of the matrix. Thereby, high optical quality is maintained for the glass. Once the polishing steps are completed, the sheet of FIG. 3b may be sliced apart either for direct use or for such further processing as is desired.

In summary, FIGS. 1 through 3d set forth apparatus and methods whereby strain free optical components such as brewster windows may be efficiently and economically produced, while yielding high optical qualities.

An alternative approach is shown in FIGS. 4a through 4d, which utilize for the production of optical components a metallic can, similar in configuration to those utilized for encapsulating transistors and other semiconductor products. Again, the metal utilized in accordance with the apparatus of FIGS. 4a through 4d is Kovar or some similarly glass-compatible metal. As set forth in FIGS. 4a through 4d, a can 401 having a top flange and an opening therethrough is filled with glass in a manner similar to that set forth hereinbefore, and may then be polished and/or silvered for use as a laser component. A plurality of cans such as shown in various views in 4a and 4b may be mounted separately in matrix fashion in a carbon boat similar to the one shown in FIG. 2 but configured appropriately to the can. Slugs of glass are thereupon placed, as by shaking, in each of the cans, and the glass is fired to fill the inside of the can and sealed thereto in a normal glass-to-Kovar bonding method.

In accordance with alternative embodiments of the present invention, the configuration of the glass 403 which is melted from slugs and formed in bonded relation to the can 401 may either be only roughly formed, and later ground and polished to the desired shape, or may be heated or cooled in a controlled manner such that the glass attains a predetermined curvature in accordance with the desired optical characteristics thereof. In other words, when the glass slugs are sealed in the can 401, they may then be advanced for individual grinding in accordance with known methods. However, for some applications, the radius of curvature of end mirrors is not extremely crucial, and need not be attained to the precision involved in a grinding process. Rather, once the glass slugs are bonded in the cans 401, the entire boat in which the cans are mounted may be refired at carefully controlled temperatures and times, such that the glass will sag by a predetermined controlled amount. The surface of the glass is then concave in formation, having a predetermined desired radius of curvature. Furthermore, if the firing conditions are rate regulated, the cooling glass forms a smooth optically finished surface. Therefore, the component is ready for final coating or other processing, utilizing simple cleaning methods or, depending upon the application, even without cleaning prior to coating of the glass surface.

While the can configuration of FIGS. 4a through 4d is shown individually, it is to be understood that rapid and efficient processing may dictate that a plurality of the cans be united in a matrix configuration such as shown in FIG. 1, thereby facilitating batch processing such as set forth in conjunction with FIGS. 2 through 3d. FIG. 4c depicts a component in which the glassed can has been refired under controlled conditions to achieve the desired sag. In FIG. 4d, the glass filled can has been mechanically ground to achieve the desired configuration. Likewise, it is to be understood that in the controlled refiring and sagging operation, supplemental steps such as in plastic vacuum formation may be employed to achieve the desired sag. Also, the FIG. 4c version may be ground as shown to avoid metal contact while polishing.

FIGS. 5a and 5b suggest an alternative approach to the controlled sagging embodiment. In those figures, a sheet of glass 502 is sandwiched between an appropriate heat resistant metal 501 and 503. When the glass 502 is clamped between the metallic sheets 501 and 503, and the aggregate is subjected to application of heat at carefully controlled temperatures for controlled periods of time, the glass in the circular open portion of the metal sheets 501 and 503 will sag to a desired curvature. When the desired sag has been achieved, the heat is removed and the glass allowed to harden. Again, the resulting optical surface is very smooth and suitable for laser applications, subject only to cleaning and/or coating.

In the embodiment of FIGS. 5a and 5b, it is preferred that the sheet of glass 502 be on the order of 3 inches in diameter and on the order of ⅛ inch thick. When the sagging operation has been completed, several hundred mirrors may be cut from each curved sheet of glass. Again, the bulk processing nature of the methods set forth drastically reduces the cost of some of the most expensive steps in the manufacturing process.

In another alternative version of the method set forth in FIGS. 5a and 5b, the metallic sheets 501 and 503 as shown may constitute but a portion of a large sheet, in which the central openings, which are arrayed in matrix fashion as in FIG. 1, are dimensioned approximately to the size of individual mirror components. Then, when the sagging occurs, each lens already is preformed, and may be cut individually from the entire sheet.

In the foregoing embodiments wherein controlled glass heating and sagging is utilized, it is convenient to monitor the deformation of the glass either by a light beam below and transverse to the glass, which is broken when the desired sag occurs, or alternatively by reflection of a beam impinging on the glass from the top. In the embodiment of FIGS. 5a and 5b, as well as those of 4a through 4c, plastic vacuum forming operations may be used to advantage.

In summary, the methods and apparatus set forth in FIGS. 1 through 5b involve the efficient and economical bulk processing of optical components for lasers. FIG. 6 sets forth in schematic fashion a laser construction method designed to utilize the components set forth hereinbefore. In FIG. 6, a laser involves a central capillary 601 and an outer casing 602. The outer casing 602 may be constructed of glass, as is conventional, or alternatively of a metallic composition, thereby forming a cathode element, but in any event it is desired that the terminal neck portions such as 607 be metallic in composition. Not shown in the FIG. 6 laser are the anode elements, or other such necessary, but conventional items. Neither is the corresponding other side of the laser shown, but it is to be understood that any symmetry may be employed such as is known in the art.

As shown, a brewster window 603 is attached by means of weldment around the annular frame 606 to the metallic neck portion 607 of the laser. The advantages of this construction are set forth in detail hereinbefore. At the end of the neck portion 607 is a mirror 604 within a can 605 such as is represented in FIG. 4d. The can 605 is secured to the end of the metallic neck portion 607 by weldment. Thus, at the stage of production shown in FIG. 6, it is to be understood that the laser has been rigidly and permanently assembled, filled with gases as desired, and is structurally complete. However, as has always been a problem in the laser fabrication arts, fully fabricated lasers may be found initially to lase weakly or not at all due to imprecise mounting of the various components, and particularly of the end mirrors, relative to each other and to the central capillary 601. Due to the rigid and permanent mounting of the mirror 604 and window 603 by weldment, however, it is possible to deform the neck portion 607 in a manner desired and thereby to displace the end mirror 604 by an amount sufficient to align it in fine tuned relationship to the remainder of the apparatus. Of course, similar procedures may be taken at either end. In preferred embodiments, deformation of the metallic neck portion 607 and corresponding displacement of the end mirror 604 occurs while the tube is energized and lasing, and the status of fine tuning may be observed by direct observation and measurement of the coherent light output of the tube. Shown situated on the neck portion 607 of the FIG. 6 laser, between the brewster angle window 603 and the end mirror 604, is a metal processing vise, 611 and 612, arranged such that the top portion 611, when subjected to downward pressure against the fixed base member 612, will cause a crimp or other similar deformation of the metallic neck portion 607 of the laser. Correspondingly, the end mirror 604 will be deflected by a predetermined amount, and thereby moved in precise alignment with the window 603 and the capillary 601. It is to be understood that the crimping may occur on any or all parts of the neck portion 607. Likewise, the neck 607 may be somewhat longer in configuration, such that another crimping as desired, might be conducted between the brewster window 603 and the capillary 601.

While the vise mechanism 611 and 612 is only shown symbolically in FIG. 6, it will be apparent that many well known tools, including hand held or bench mounted, and hand powered or mechanically powered, may be utilized, it only being important that a controlled amount of crimp may be placed on the neck portion while the laser is energized, such that the varying output of the instrument may be measured to determined when the optical component being deflected is in proper precise alignment with the other components of the laser.

It is to be understood that the apparatus and methods set forth herein are intended to be illustrative of the principles of the present invention, but that other alternatives may well occur to those of ordinary skill in the art without departing from the spirit or the scope of the present invention.

I claim:

1. A method of manufacturing laser apparatus, comprising:
   a. fabricating a laser tube enclosure having metallic portions at least at the prospective location of optical components;
   b. completing the fabrication of said laser to integral structural completeness;
   c. energizing said laser; and
   d. deflecting said enclosure by applying pressure to metallic portions of said enclosure, thereby optimally aligning said optical elements, characterized in that said deflecting step comprises at least once
      i. mounting said metallic portion on a metal processing vise having a movable top portion and an opposing fixed base member,
      ii. applying pressure to said top portion to cause a crimp to be formed at the point of contact of said top portion against said metallic portion, correspondingly deflecting an optical component relative to the axis of said laser, while monitoring the coherent light output of said tube.

2. A method as described in claim 1 wherein said completing step includes:
   fabricating optical components of metallic periphery and glass center portions; and
   securing said components by weldment of said metallic periphery to said metallic portions of said enclosure.

3. A method as described in claim 1 wherein said deflecting step is repeated a plurality of times at different predetermined positions along said metallic portion.

4. A method as described in claim 3 wherein said fabricating step includes providing a laser tube enclosure having an elongated metallic neck portion at at least one end, wherein said completing step includes welding a brewster angle window within said neck and an end mirror at the terminus of said neck, and wherein said deflecting step is performed at least twice by consecutively locating said vise on the side of said brewster window opposite said mirror, and then locating said vise at at least one point intermediate said window and said mirror.

5. A method of manufacturing laser apparatus comprising:
   fabricating a laser tube enclosure having metallic portions at least at the prospective location of optical components;
   completing the fabrication of said laser to integral structural completeness;
   energizing said laser; and
   deflecting said enclosure by applying pressure to the metallic portions of said enclosure, thereby optimally aligning said optical components;
   wherein said completing step includes
   fabricating optical components of metallic periphery and glass center portions;
   securing said components by weldment of said metallic periphery to said metallic portions of said enclosure; and
   wherein said fabricating step comprises
   providing a plurality of metallic annular elements;
   placing said elements in a mold having cavities around at least part of each of said annular elements;
   providing glass slugs in each of said cavities;
   forming glassed annular portions of said elements by melting and cooling said slugs; and
   optically finishing said glass.

* * * * *